Feb. 15, 1949.  J. P. TRECIOKAS  2,461,944
MACHINE FOR FORMING AND JOINING
SNAP FASTENER TAPES
Filed Oct. 23, 1945  4 Sheets-Sheet 2
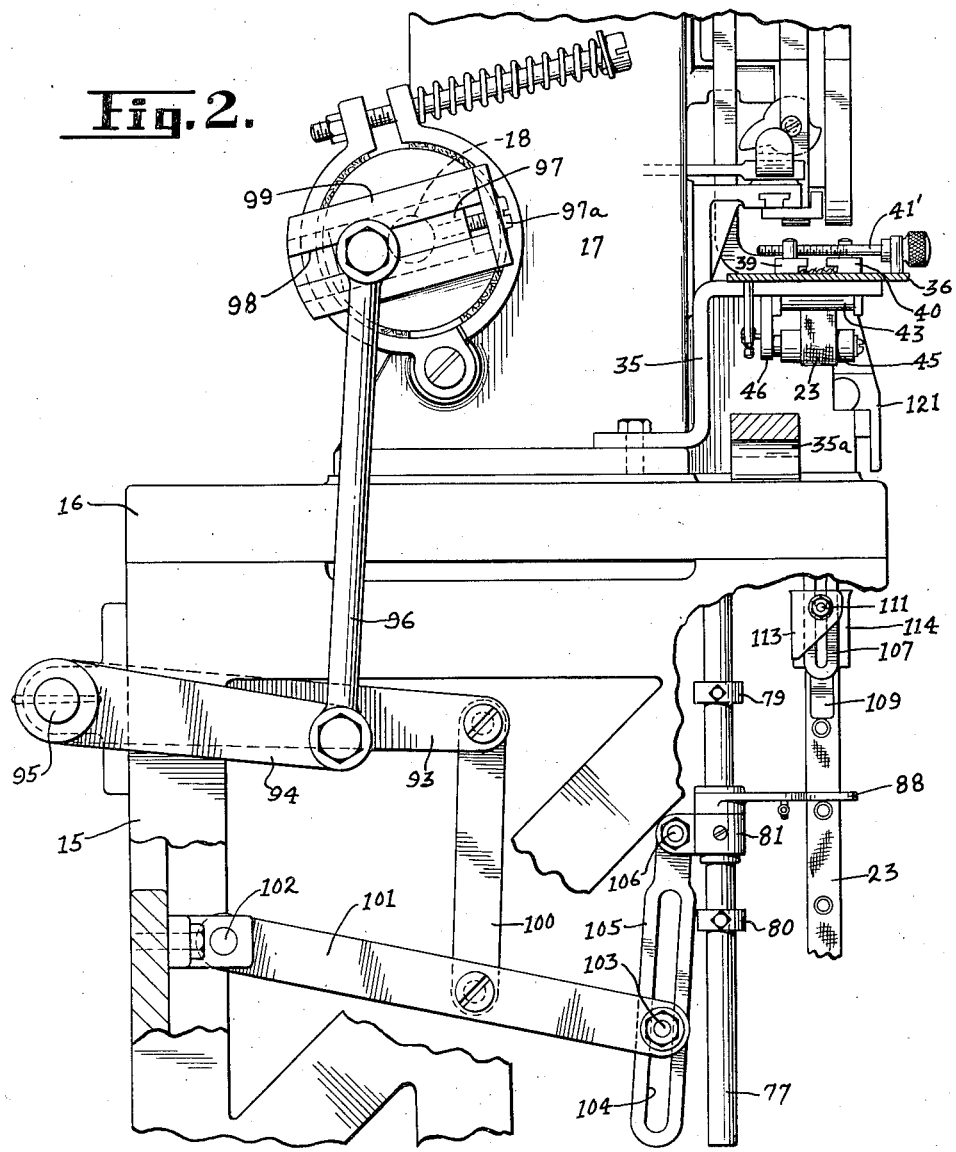
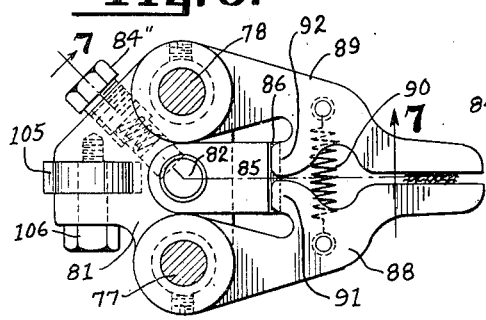
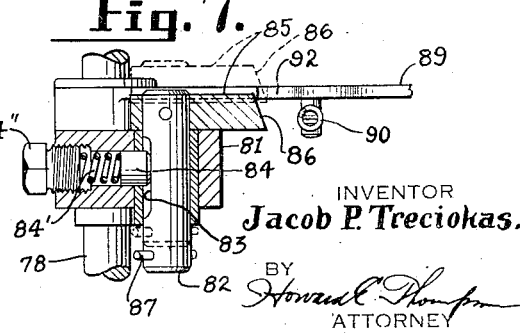
INVENTOR
*Jacob P. Treciokas.*
BY
*Howard C. Thompson*
ATTORNEY Feb. 15, 1949.                     J. P. TRECIOKAS                     2,461,944
                          MACHINE FOR FORMING AND JOINING
                                  SNAP FASTENER TAPES
Filed Oct. 23, 1945                                          4 Sheets-Sheet 3
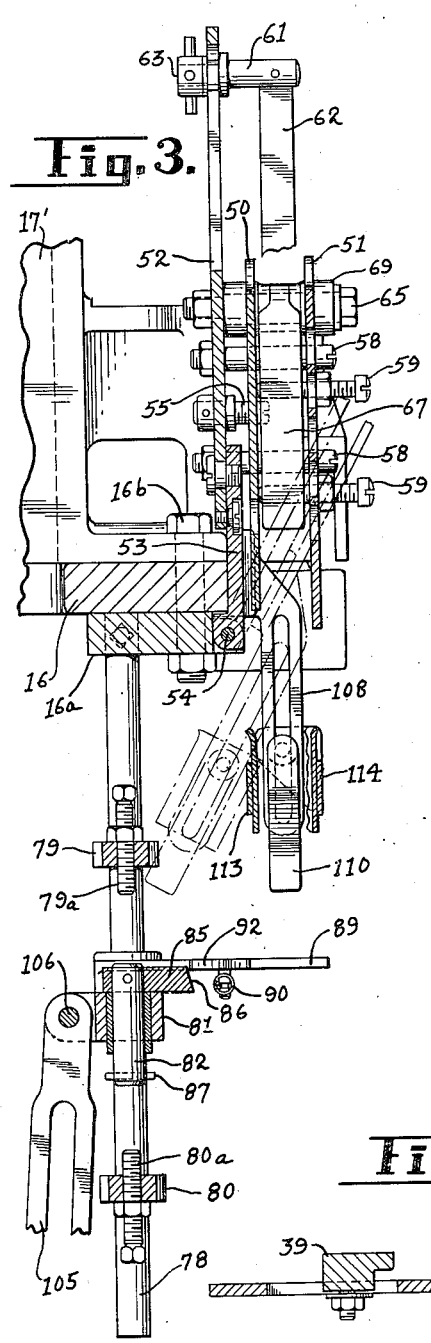
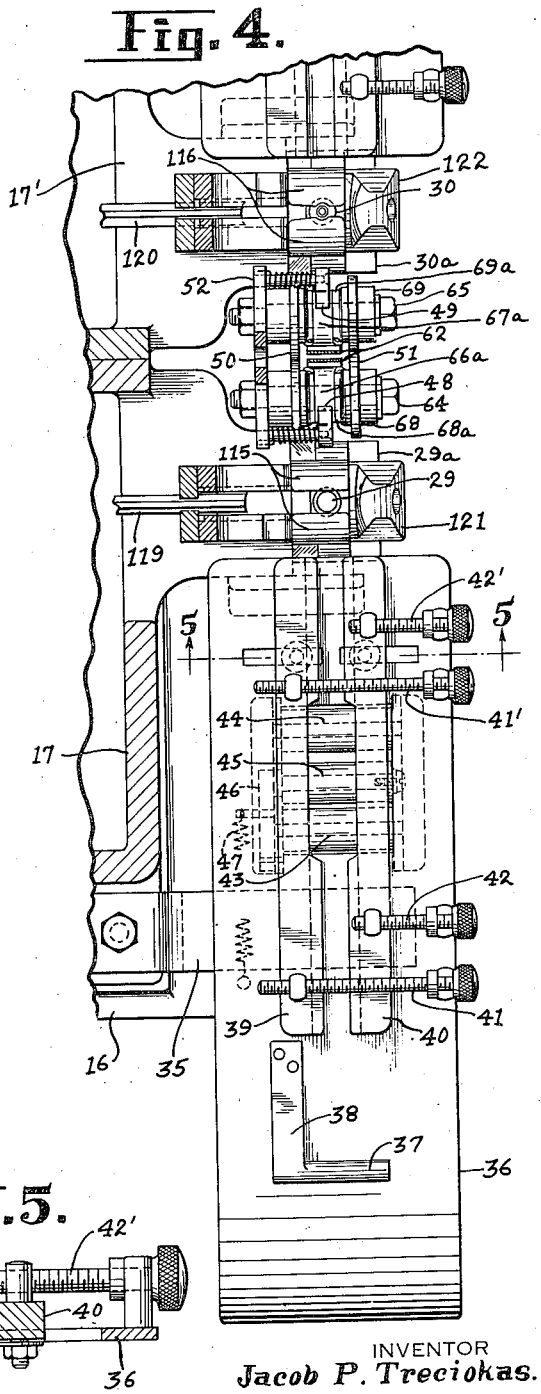
INVENTOR
Jacob P. Treciokas.
BY
Howard C. Thompson
ATTORNEY

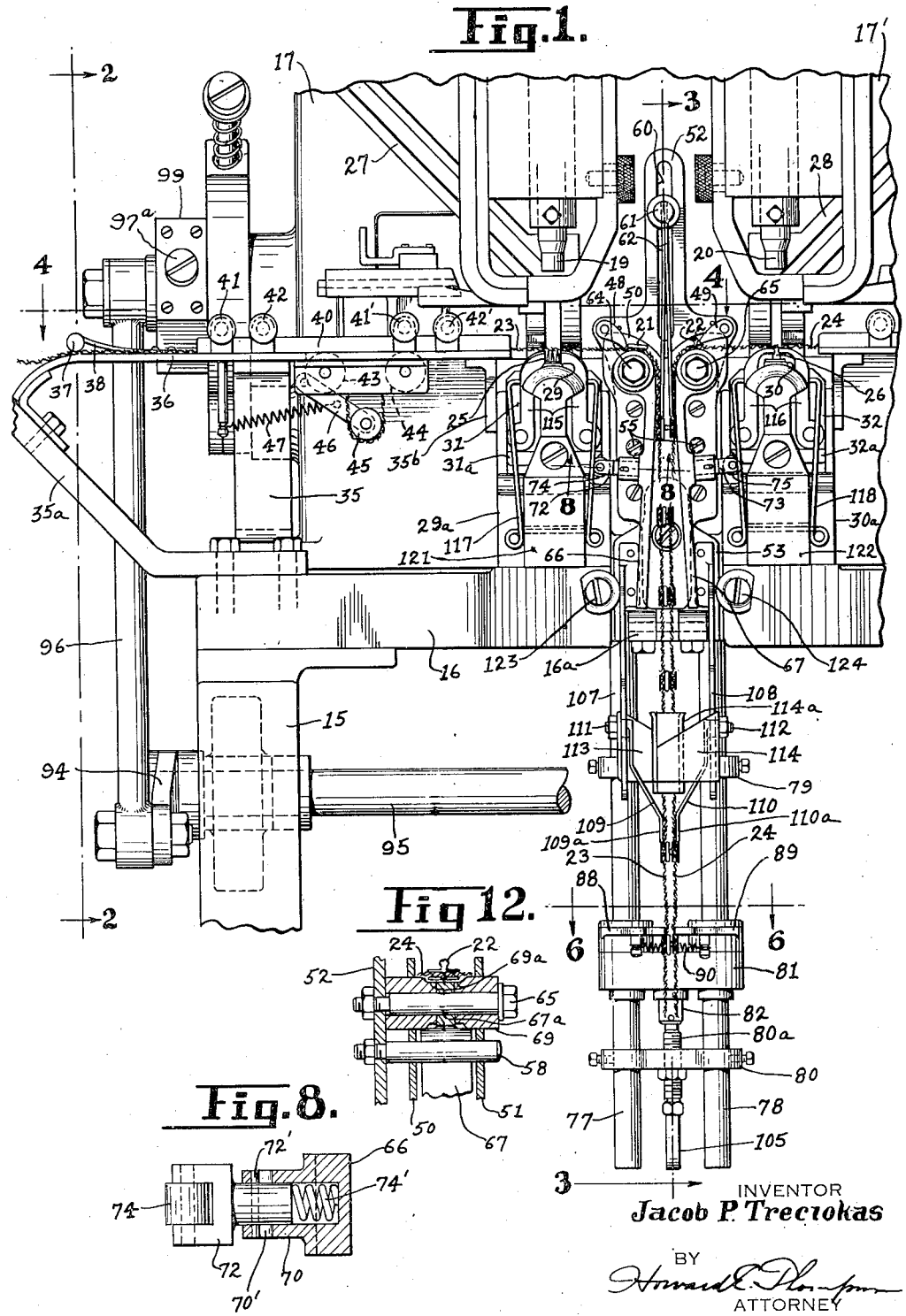

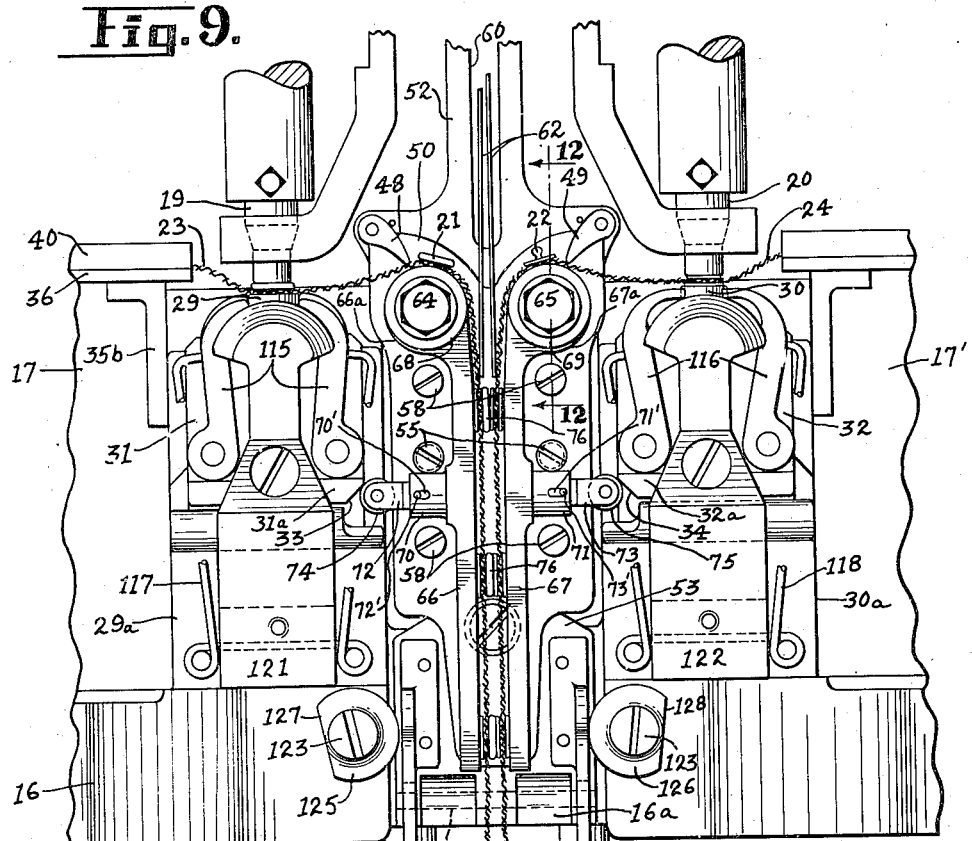

Patented Feb. 15, 1949

2,461,944

UNITED STATES PATENT OFFICE 2,461,944

MACHINE FOR FORMING AND JOINING SNAP FASTENER TAPES

Jacob P. Treciokas, Oakville, Conn., assignor to Scovill Manufacturing Company, Waterbury, Conn., a corporation of Connecticut Application October 23, 1945, Serial No. 624,065

23 Claims. (Cl. 218—18)

1

This invention relates to machines for first attaching socket and stud parts of snap fastener devices to a pair of tapes and to then join the socket and stud parts of opposed or companion tapes in producing a united fastener tape product. More particularly, the invention comprises what might be termed a machine attachment having means for feeding a pair of tapes through the machine to position the tapes for attachment of socket and stud parts or members thereto and to, then, aline socket and stud members at a coupling or engaging station for uniting said members in forming the resulting assembled dual tape product.

The novel features of the invention will be best understood from the following description, when taken together with the accompanying drawing, in which certain embodiments of the invention are disclosed and, in which the separate parts are designated by suitable reference characters in each of the views and in which:

Fig. 1 is a front elevation of a dual snap fastener mounting machine for attaching socket and stud parts to individual tapes and showing my improved feed and coupling or assemblage mechanism, the machine being shown with parts broken away and omitted.

Fig. 2 is an end view of the machine with a section substantially on the line 2—2 of Fig. 1 and with parts broken away and omitted.

Fig. 3 is a section substantially on the line 3—3 of Fig. 1 and showing only a part of the construction, with parts broken away.

Fig. 4 is a section substantially on the line 4—4 of Fig. 1 of the drawing.

Fig. 5 is a detailed section on the line 5—5 of Fig. 4 on an enlarged scale.

Fig. 6 is a section on the line 6—6 of Fig. 1 on an enlarged scale.

Fig. 7 is a section on the line 7—7 of Fig. 6.

Fig. 8 is a sectional view through one of the jaws taken on the line 8—8 of Fig. 1.

Fig. 9 is a view similar to Fig. 1 showing only a part of the construction on an enlarged scale, with the closing jaws in element closing position.

Fig. 10 is a front elevation of a guide plate which I employ and shown in section in Fig. 3, but removed in Figs. 1 and 9.

Fig. 11 is a side edge view of the plate shown

2 in Fig. 10 with part of the construction broken away; and

Fig. 12 is a section on the line 12—12 of Fig. 9.

The machine illustrated in part in the accompanying drawings, and, in some respects, diagrammatically, is generally of the type and kind disclosed in Patent Number 1,499,270 to Warner et al., issued June 24, 1924. Thus, only such parts of the machine disclosed in said application are illustrated as are necessary to understand my invention, which deals primarily with the feed of fastener tapes of the kind under consideration and the assemblage of complementary fastener elements on the tapes in delivering a united dual tape product from the machine.

Considering Figs. 1 and 2 of the drawing, 15 represents part of the base portion or standard of the machine, upon which is disposed a table 16. Supported on the table 16 are two separate machine heads built in frames 17 and 17' having the usual fastener setting mechanism and driven from a single source of power, as fully described in the above Warner patent. Specifically, the mechanism associated with frame 17 is for attaching the elements of a snap fastener socket and the mechanism associated with frame 17' is for attaching the element of a snap fastener stud. At the rear portion of the frames 17, 17' is mounted a common drive shaft 18. At the front of the frames 17, 17' are vertically movable setting plungers 19 and 20 for securing socket and stud members 21 and 22 to mounting tapes 23 and 24 at equally spaced intervals on the respective tapes.

Suitably supported upon anvils 29 and 30 located below and in alinement with the plungers 19 and 20 are attaching members, in this case shown to be a prong ring 25 and a post element 26, for securing the socket and stud parts 21 and 22 respectively to the tapes 23 and 24 in the descent of the plungers 19 and 20, as appearing in Fig. 9 of the drawing, in which position the plungers 19 and 20 are in their lowermost position. The attaching elements 25 and 26 are picked up individually from the lower end of the feed tracks 27 and 28 and fed into position upon the anvils 29 and 30, generally referred to as the setting station of the machine, by means of feed fingers 119 and 120 (see Fig. 4), the elements 25 and 26 being initially supplied to the feed tracks 27 and 28 from conventional hoppers, not shown. The elements 25 and 26 are held upon their respective anvils 29 and 30, prior to the setting operation, by a pair of jaw members 115 and 116 pivotally attached to movable plates 31 and 32 slidably mounted upon anvil support blocks 29a and 30a formed as a projecting integral part of the head frames 17 and 17'. The jaw carrying plates 31 and 32 are adapted to move downwardly coincident with the setting operation of the machine carrying their respective pair of jaws 115 and 116 with them so as to clear the latter from the working surfaces of the anvils 29 and 30. The mechanism for moving the jaw carrying plates 31 and 32 is clearly disclosed in the Warner et al. patent previously mentioned. The plates 31 and 32 are provided with projecting portions 31a and 32a, the adjacent inner ends of which are bevelled as at 33 and 34 and serve to operate a part of my attachment, as later described.

In that each side of the machine is substantially of the same construction, insofar as the delivery and guiding of the tape is concerned, only one side has been completely illustrated, namely that appearing on the left side of the machine, as seen in Fig. 1 of the drawing, and also shown in plan in Fig. 4 of the drawing.

Supported on the table 16 is a bracket 35 which supports the mid-position of a workpiece guide table 36, and another bracket 35a likewise supported on the table 16 and angularly extending away therefrom supports the outer end of said guide table 36, as noted in Fig. 1. A third bracket 35b attached to the anvil support block 29a serves to support the inner or right end of said table 36. The tape 23 may be fed off from a suitable reel, not shown. The tape 23 enters upon the upper surface of the table 36 beneath a cylindrical tension finger 37 supported on a spring arm 38, the purpose of this construction being to apply slight friction to the tape to hold the tape taut at all times and, yet, provide for a feed of the tape through the machine. Supported on the table are two elongated tape guides 39 and 40 adjustable relatively to each other by two long adjustment screws 41, 41' engaging the guide 39 and shorter screws 42, 42' engaging the guide 40.

The table 36 is cut-out between the guides and supported in the cut-out are suitable guide rollers 43, 44, between which is another workpiece or tape guide roller 45 supported on an arm 46, tensioned by a spring 47, note Fig. 1. It will, thus, be apparent that the tape 23 passes downwardly over the roller 43 around the roller 45 and, then, upwardly over the roller 44. This construction puts a light tension loop in the tape to also maintain the tape in a taut condition during the operation of the machine and allows for flexing of the tape when the plungers 19 and 20 move downwardly, as shown in Fig. 9.

Noting Figs. 1, 4 and 9 there will be seen two spring actuated pawls 48 and 49 which are constantly held in engagement with the surface of the tape and are adapted to engage attached socket and stud parts 21 and 22 in checking reverse movement of the tape, particularly in attaching the next successive fastener parts to the tape while, at the same time, the tape with the fastener parts thereon is free to pass beneath the pawls 48 and 49 in the step by step feed of the tape, as later described. The adjustment of the guide plates 39 and 40 is to adapt the machine for tape widths of different sizes and, further, to aline the tape with respect to a rear tape guide plate 50 and a removable front tape guide plate 51. The rear guide plate 50 is adjustably supported upon a supporting plate 52 having its lower end secured to a swinging arm 53 pivoted, as seen at 54, in a hinge bracket 16a detachably secured to the underside of the table 16 as by bolts 16b. The plate 52 forms the support for the pawls 48 and 49, as will appear in Fig. 4 of the drawing. Screws 55 have a swivel mounting upon plate 52 and a threaded engagement in the guide plate 50 for adjusting the latter relative to feed plate 52. The plate 51 has a series of holes therein for rendering the passage of the tape and fasteners visible and also includes apertures 56 for registration with the screws 55, so that the latter may be adjusted without removing the plate 51. The plate 51 includes apertures 57 which fit snugly upon studs 58 on the plate 52 and forms the support for the plate 51. The plate 51 also carries adjustable stop screws 59 for checking movement thereof on the stud 58 in controlling spacing between plates 50 and 51.

The supporting plate 52 includes an upwardly directed extension having an elongated slot 60 therein, in which is adjustably supported a pin 61, note Fig. 3, supporting a pair of long spring fingers 62 which extend down between the two tapes 23 and 24 and are adapted to aline and maintain alinement and also prevent back travel of the opposed socket and stud parts 21 and 22, preparatory to the coupling of said parts, as will be seen upon consideration of Figs. 1 and 9 of the drawing. It will be apparent that the pin 61 is adjustably supported in the elongated aperture for proper positioning of the spring fingers 62 relative to the fastener parts and movable to accommodate different spacings of fastener parts on the tapes and sizes in the fastener parts. The pin 61 may be adjustably clamped in position on plate 52 as by a spoked or other winged-type nut 63.

Secured to the plate 52 are two bolts or studs 64 and 65; pivotally supported on each of these studs are a pair of spaced rollers 68 and 69 having reduced inner adjacent portions 68a and 69a (see Fig. 4). Also supported on the stud bolts 64 and 65 are element clamping jaws 66 and 67 having upper hub portions 66a and 67a which pivot on said bolts 64 and 65 and are of a diameter about equal to the reduced portion 68a and 69a of the rollers 68 and 69. The tapes 23 are adapted to pass over that portion of the rollers 68 and 69 that are confined between the guide plates 50 and 51. The adjacent roller portion 68a and 69a and the jaw hub portions 66a and 67a are of a reduced size in order to accommodate the fastener elements secured on the tapes, as shown in Fig. 12. The jaw members may be also defined as fastener joining or assembling members and these members are actually in the form of long arms which are brought together in parallel relationship in assemblage of the fastener parts 21 and 22, note Fig. 9, and which otherwise bias apart, as seen in Fig. 1 under the influence of the spring fingers 62. Supported in sleeve extensions 70 and 71 of the members 66 and 67 are spring actuated yoke-shaped supports 72 and 73 for rollers 74 and 75. As best seen in Figs. 8 and 9 the yokes 72 and 73 have shanks that are slidably mounted in the extensions 70 and 71 against the tension of backing-up springs 74' (Fig. 8). The yokes 72 and 73 are held against rotation and keyed in place by pins 72' and 73' transversely mounted in the yoke shanks and the ends thereof operate in elongated apertures 70' and 71' in the bearings or supports 70. The rollers are disposed in abutting engagement with the lower portion of the bevelled surfaces 33 and 34 of the plate projections 31a and 32a, so that, as these plates are moved downwardly from the position shown in Fig. 1 to that shown in Fig. 9, this downward movement will cause the rollers 74 and 75 to move inwardly, closing the jaw members 66 and 67, thus uniting the alined socket and stud parts 21 and 22, which results in joining the fastener elements secured to the two tapes 23 and 23 in the manner clearly illustrated, as for example, at 76 in Fig. 9 of the drawing. By reason of the backing-up springs 74' the rollers 74 and 75 are thus cushioned against the operation of the cam surfaces 33 and 34 to prevent the elements from being destroyed in case they are not properly alined on their respective tapes 23 and 24 between the jaws 66 and 67 during the snap action assembly and also to act as a safety measure against any severe strains upon the mechanism in case the elements become jammed or other faults that may occur in the operation of the mechanism. The spring fingers 62, in addition to acting as a back stop for the tapes 23 and 24, are designed to be tensioned outwardly to a degree to hold the tapes in close contact with the adjacent area of the clamping jaws 66 and 67 and also maintain said jaws 66 and 67 in their normal outwardly biased position, as seen in Fig. 1, with the rollers 74 and 75 in contact with the bevelled surfaces 33 and 34.

The tapes having the fasteners united, as at 76, thereon are fed downardly between the jaw members 66 and 67 by a tape feed means, shown in Figs. 1, 2, 3 and 9 of the drawing. Extending downwardly from the bracket 16a, located beneath the table 16 and positioned rearwardly of the jaw members 66 and 67, are a pair of guide rods 77 and 78 having adjustable upper and lower yokes 79 and 80 supporting adjustable stop screws 79a and 80a midway between the rods 77 and 78. Slidably mounted on these rods is a crosshead 81, in the center of which is supported a friction pin 82 having a flattened portion 83 engaged by a spring-pressed friction plug 84. The pin carries, at its upper end, a cam plate 85 having a cam surface 86, note Figs. 6 and 7. The pin 82 has a transverse stop pin 87 which limits upward movement thereof. Pivotally supported on the rods 77 and 78 are a pair of gripper fingers 88 and 89; these fingers are disposed upon the top of and carried with the crosshead 81, as clearly seen in Figs. 1 and 6 of the drawing and a spring 90 couples the gripper fingers 88 and 89 to normally bias the same in gripping position on opposite sides of the tapes 23 and 24. The fingers 88 and 89 have offset cam engaging portions 91 and 92 disposed adjacent the cam surface 86 of the cam 85.

The grippers fingers 88 and 89 are the means for moving the tapes intermittently through the machine and are operated to open and close upon the tapes by the relative position of the cam plate 85 to the crosshead 81. When the crosshead 81 is moving downwardly on the rods 77 and 78 by a mechanism, to be described later, the cam plate 85 is then positioned as seen in Figs. 3 and 7, and the fingers 88 and 89 are clamped upon the tapes, pulling the same downwardly. At the end of the down stroke of the crosshead 81, the pin 82 strikes the lower stop screw 80a and is forced upwardly, relative to the crosshead moving the cam plate 85 to the dotted line position, as seen in Fig. 7, causing the cam surface 86 to bias the offset portions 91 and 92 of the gripper fingers 88 and 89 and consequently force said fingers to move outwardly; released from the tapes, and to remain so released during the up-stroke of the crosshead 81. At the end of the upstroke of the crosshead 81, the pin 82 abuts the upper stop screw 79a and shifts the pin 82 and attached cam plate 85 back and consequently causes the fingers 88 and 89 to clamp upon the tape, starting another cycle of operation of the tape drawing means. The spring-pressed friction plug 84 is sufficiently tensioned by a relatively strong spring 84' abutted thereagainst to assure that the cam plate 85 maintains its adjusted upper and lower positions, as determined by the stop screws 79a and 80a. The frictional force of the plug 84 may be varied, as desired, by a screw 84" adjustable in the crosshead 81 and backed-up against the tension spring 84'.

The crosshead 81 is actuated through mechanism most clearly illustrated in Fig. 2 of the drawing and comprises a series of levers and arms, as well as a long and a short lever 93 and 94 pivoted to the frame, as at 95, both attached to the same pivot to move simultaneously. Pivoted with the lever 94 is a connecting rod 96, the other end of which is pivoted to a slide 97 adjustably supported in the channel portion 98 of a crank-head 99 at one end of the main drive shaft 18. The motion is transmitted from the lever 93 to the crosshead 81 through a link 100 pivoted to the outer end of said lever 93 and connected to the mid-portion of another lever 101 having one end pivoted to the frame, as at 102, and the opposite end of the lever 101 being adjustably clamped, as at 103, in the elongated aperture 104 of a link 105 pivoted to the crosshead 81, as indicated at 106. It will thus be apparent that, in the actuation of the machine, rotary motion of the crank-head 99 will transmit rectilinear motion to the crosshead 81 through the above system of levers and links described. The travel of the crosshead up and down the rods 77 and 78 may be varied to any prescribed lengths as determined by the desired spaced setting of the fastener elements upon the tapes by adjustment of the slide 97 in the crank-head 99, as by means of an adjusting screw 97a (Fig. 2).

Extending outwardly and downwardly from the front face of the swinging arm 53 are brackets 107 and 108, slotted for adjustable clamping of spring stop fingers 109 and 110, as by bolts 111 and 112, note Fig. 9. The fingers 109 and 110 extend inwardly and terminate in parallel portions 109a and 110a that are adapted to rest against the outer surfaces of the tapes 23 and 24 at a position relatively close to the most adjacent coupled elements 76, as indicated in Figs. 1 and 2 of the drawing, in the step by step feed of the tapes 23 and 24, and serve to retain the tapes with attached elements in a downwardly fed position against any inherent snap action in the tape due to the relatively quick release of the gripper feed fingers 88 and 89 at the end of their downward stroke. It is to be further noted that the gripper feed fingers 88 and 89, at the end of their upward stroke, are adapted to engage against the parallel portions 109a and 110a of the fingers 109 and 110, instead of directly upon the tapes, note Fig. 9, preparatory to the next downward feed of the tape. The fingers 109 and 110 have a spring action, so as to allow the tapes with the fasteners 21 and 22 thereon to pass between said fingers, as well as to allow for inward movement of the fingers when engaged by the grippers 88 and 89.

Supported on the brackets 107 and 108 are angle plates 113 and 114 having at their inner ends vertically disposed members of L-shaped cross-sectional form which collectively form a guide channel 114a for maintaining the tapes in alinement with the fingers 109 and 110, and also to prevent too much of a whipping action by the tape above the fingers 109 and 110 when the tapes are being fed through the machine by the relatively quick downward action of the crosshead 81.

As previously described, the attaching elements 25 and 26 are held in position on top of the anvils 29 and 30 by means of pairs of jaws 115 and 116 respectively. The pairs of jaws 115 and 116, as best seen in Figs. 1 and 9, are pivotally mounted on the slide plates 31 and 32 and are tensioned inwardly against the opposite sides of the anvils 29 and 30 by yoke-shaped springs 117 and 118. The springs 117 and 118 are held in position against the front face of the anvil blocks 29a and 30a as by jaw plates 121 and 122 secured to said blocks and which plates also serve to maintain the pairs of jaws 115 and 116 on their respective pivots. Preliminary to the descent of the plungers 19 and 20 for the setting operation, the slide plates 31 and 32 are moved downwardly carrying the jaws 115 and 116 and their upper incurved ends are caused to cam over the upper ends of the anvils 29 and 30 to a spread position, as shown in Fig. 9, and clear of the elements 25 and 26. Reciprocal motion is imparted to the slide plates 31 and 32 by a mechanism fully described in the Warner et al. patent mentioned above.

From the foregoing, it will appear that the two tapes 23 and 24 are guided into position beneath the plungers 19 and 20 and, when the tapes are at rest, the two fasteners 21 and 22, namely the socket and stud parts, are simultaneously attached to the tapes, after which the plungers 19 and 20 raise and the tapes are then fed downwardly by the feed gripper jaws 88 and 89, a distance controlling the spacing of the fasteners along the tapes.

In this downward feed, the fasteners just formed are brought beneath and just beyond the pawls 48 and 49 and these pawls serve to prevent reverse movement of the tapes in the operation of securing the next successive fasteners thereto, particularly as the tapes are flexed downwardly in the manner illustrated in Fig. 9. To compensate for this flexure, the roller 45 is pivoted upwardly against the influence of the spring 47 and necessarily keeps the tapes taut at all times without drawing any more tape under the tension finger 37 mounted on the guide table 36.

As fastener devices are formed on the tapes and the tapes feed downwardly through the guides and beyond the limits of the grippers, in each cycle of operation, the pairs of fasteners arranged in opposed relationship to each other between the jaw members 66 and 67 are brought into coupled relationship with each other in movement of the jaw members toward each other by the slide plates 31 and 32, as previously described. The fingers 62 also serve to maintain alinement of the fastener devices between the jaws in the operation of coupling the same and prevent any backward movement of one tape relatively to the other. This movement is also checked by the spring fingers 109 and 110. The latter fingers, however, also serve to guide and direct the gripper fed jaws 88 and 89 downwardly onto the tapes in engagement with the fasteners 21 and 22 in controlling the feed of the tapes and prevents any possible frictional engagement with the tapes upwardly beyond the fastener devices 21 and 22, which might result in irregular or varying feed or spacing of the fasteners on the tapes.

The operation of the machine will be readily understood from the foregoing description, taken in connection with the accompanying drawings and the following statement. In the first place, it will be apparent that the tapes are tensionally supported as they come from a suitable roll or spool preparatory to passing between the pair of plungers and anvils at the fastener attaching stations. The tapes are further guided between a fastener assemblage station and through a tape feed station. At these latter stations, the tapes are brought into close face to face proximity to each other as will clearly appear in Fig. 1 of the drawing. Considering the operation from the standpoint of the showing in Fig. 1, where fasteners have been applied to the tapes, it will appear that the spring fingers 109 and 110 engage opposite surfaces of the tapes adjacent the fasteners attached thereto and hold the tapes against movement laterally or otherwise in the operation of the gripper fingers 88 and 89. The spring fingers 62 engage the fasteners on the tapes to hold the tapes against backward movement and the pawls 48 and 49 engage other fasteners adjacent the plungers and anvils to prevent the tapes from being drawn backwardly in the operation of attaching fasteners to the tapes. In this latter operation, any draw on the tape will be taken up through the tension means controlling tape feed. After fasteners have been attached to the tapes, the gripper fingers 88, 89, in engagement with assembled tapes, move downwardly to feed both tapes simultaneously to bring the next widely spaced sections of the tapes in position for reception of complemental fastener elements. At the completion of the tape feed, another pair of fasteners are brought into position engaged by the ends of the spring fingers 62, then the jaw plates 66, 67 are moved toward each other to assemble fasteners which have been brought to position for assemblage at the assembled station. Another pair of fasteners are attached to the new sections of the tapes and then the above cycle of operation is repeated. It will be understood that, in the above cycle of operation and after the gripper fingers 88, 89 have fed the assembled tapes the required distance, the jaws are separated and moved upwardly into position to engage the tapes for the next successive feed operation.

It will be apparent that, while the invention has been illustrated as applicable to machines for attaching fastening devices of a specific type and kind to a pair of tapes, my invention is not limited in this respect, the present disclosure being solely for the purpose of illustrating one adaptation and use of the invention.

For sake of description, the parts of the machine where the fastener devices, such as the socket and stud parts are attached, may be referred to as an attaching or mounting station. In like manner, the relatively movable jaw plates 66 and 67 may be said to comprise a coupling or assemblage station, where the fastener devices of the opposed tapes are coupled together in forming the unit dual tape structure. Still further, the gripper fingers 88 and 89 may be referred to as a tape feeding station. It wi'l thus appear that means is provided between the attaching station and assemblage station for retaining the tape against backward movement, namely the pawls 48 and 49 further assisted by the spring fingers 62. The other means for retaining the tapes against reverse movement are the spring fingers 109 and 110, which for the most part, are disposed between the coupling station and the feed station. The plates 39 and 40 serve to guide the tapes to the fastener attaching station; the plates 50, 51 guide the tapes to the uniting station; whereas the guide channel 114a maintains the tapes in proper alinement with respect to the fingers 109 and 110 and the grippers 88 and 89.

From an inspection of Fig. 3, it is noted that the entire mechanism for snapping the fastener elements upon the tape is carried by the hinging plate 53, which is supported in block 16a, and this entire assemblage unit can be tilted to a forward inclined position, as shown in dot-and-dash outline in said Fig. 3. The purpose of tilting this unit forward is in order to get at the regular machine jaw units or any other mechanisms that may become fouled up or jammed with elements. The hinging plate 53 is held in its upright position as by means of special screws 123 and 124 attached to the front face of the support table 16. The screws 123 and 124 are provided with flanged portions 125 and 126 that normally overlie the opposite edges of the hinging plate 53 to maintain the latter in its assemblage position. The flanges 125 and 126 of the screws 123 and 124 are provided with cut-out sections 127 and 128 that will clear the edges of the hinging plate 53 and allow said plate with its attached mechanisms to tilt forwardly.

It is further to be noted that both the assemblage unit and the rods 77 and 78 supporting the tape moving unit are attached to the same block 16a, and both units may be removed from the machine as a single mechanism for repair purposes by merely removing the bolts 16b and the clamping bolt 103 that attaches the lever 101 to link 105. Obviously these two units attached to the common bracket can likewise be built separately from the button attaching machine and can be readily attached thereto.

Having fully described my invention, what I claim as new and desire to secure by Letters Patent is:

1. A machine for producing coupled snap fastener tapes, spaced fastener attaching devices each comprising an anvil and a plunger movable toward and from the anvil, means including tension devices for guiding a pair of tapes between said anvi's and plungers, means for intermittently and collectively feeding the tapes to bring predetermined widely spaced sections of the tapes in alinement with said plungers for attachment of fasteners to said widely spaced sections of the tapes, the fastener of one tape being adapted for coupling engagement with the fastener of the other tape, means guiding the tapes into face to face relationship to each other, and means for coupling the fasteners of said tapes to unite the tapes face to face.

2. A machine for producing coupled snap fastener tapes, spaced fastener attaching devices each comprising an anvil and a plunger movable toward and from the anvil, means including tension devices for guiding a pair of tapes between said anvils and plungers, means for intermittently and collectively feeding the tapes to bring predetermined widely spaced sections of the tapes in alinement with said plungers for attachment of fasteners to said widely spaced sections of the tapes, the fastener of one tape being adapted for coupling engagement with the fastener of the other tape, means guiding the tapes into face to face relationship to each other, means for coupling the fasteners of said tapes to unite the tapes face to face, and means controlling feed spacing of the tapes.

3. A machine for producing coupled snap fastener tapes, spaced fastener attaching devices each comprising an anvil and a plunger movable toward and from the anvil, means including tension devices for guiding a pair of tapes between said anvils and plungers, means for intermittently and col'ectively feeding the tapes to bring predetermined widely spaced sections of the tapes in alinement with said plungers for attachment of fasteners to said widely spaced sections of the tapes, the fastener of one tape being adapted for coupling engagement with the fastener of the other tape, means guiding the tapes into face to face relationship to each other, means for coup'ing the fasteners of said tapes to unite the tapes face to face, means controlling feed spacing of the tapes, and other means adjacent the plungers supporting the tapes in position in the operation of attaching the fasteners to the tapes.

4. A machine for producing coupled snap fastener tapes, spaced fastener attaching devices each comprising an anvil and a plunger movable toward and from the anvil, means including tension devices for guiding a pair of tapes between said anvils and plungers, means for intermittently and collectively feeding the tapes to bring predetermined widely spaced sections of the tapes in alinement with said plungers for attachment of fasteners to said widely spaced sections of the tapes, the fastener of one tape being adapted for coupling engagement with the fastener of the other tape, means for guiding the tapes into face to face relationship to each other, means for coupling the fasteners of said tapes to unite the tapes face to face, said last named means comprising a pair of elongated jaw plates, and means for guiding the tapes between said plates.

5. A machine for producing coupled snap fastener tapes, spaced fastener attaching devices each comprising an anvil and a plunger movable toward and from the anvil, means including tension devices for guiding a pair of tapes between said anvils and plungers, means for intermittently and collectively feeding the tapes to bring predetermined widely spaced sections of the tapes in alinement with said plungers for attachment of fasteners to said widely spaced sections of the tapes, the fastener of one tape being adapted for coupling engagement with the fastener of the other tape, means guiding the tapes into face to face relationship to each other, means for coupling the fasteners of said tapes to unite the tapes face to face, said last named means comprising a pair of elongated jaw plates, means for guiding the tapes between said plates, and means for moving the jaw plates toward each other in the operation of attaching fasteners of said tapes.

6. In machines for applying snap fasteners to equally spaced sections of a pair of tapes and in coupling the fasteners to unite said tapes, means for simultaneously feeding both tapes through the machine to control spacing of fasteners thereon, said means comprising a pair of gripper jaws movable into firm engagement with the tapes in the feed thereof and out of engagement with the tapes in movement of the jaws longitudinally with respect thereto, and means involving adjustable levers for controlling the length and range of the longitudinal feed stroke of said gripper jaws.

7. In machines for applying snap fasteners to equally spaced sections of a pair of tapes and in coupling the fasteners to unite said tapes, means for simultaneously feeding both tapes through the machine to control spacing of fasteners thereon, said means comprising a pair of gripper jaws movable into firm engagement with the tapes in the feed thereof and out of engagement with the tapes in movement of the jaws longitudinally with respect thereto, means involving adjustable levers for controlling the length and range of the longitudinal feed stroke of said gripper jaws, and adjustabe stops controlling movement of the gripper jaws in both directions longitudinally with respect to said tapes.

8. In machines for applying snap fasteners to equally spaced sections of a pair of tapes and in coupling the fasteners to unite said tapes, means for simultaneously feeding both tapes through the machine to control spacing of fasteners thereon, said means comprising a pair of gripper jaws movable into firm engagement with the tapes in the feed thereof and out of engagement with the tapes in movement of the jaws longitudinally with respect thereto, means involving adjustable levers for controlling the length and range of the longitudinal feed stroke of said gripper jaws, adjustable stops controlling movement of the gripper jaws in both directions longitudinally with respect to said tapes, and means engaging fasteners of the tapes maintaining one directional movement of the tapes through the machine.

9. In machines of the class described, spaced fastener mounting stations, means for guiding a tape into each of said stations, a fastener coupling station, means for guiding the tapes from the mounting stations into close proximity and alinement at the coupling station, means at the coupling station to unite the fasteners to join said tapes, a feed station spaced with respect to said coupling station, and means at the feed station engaging the united tapes in intermittent feed of the tapes to bring longitudinally spaced sections of each tape in registering position with said spaced mounting stations.

10. In machines of the class described, spaced fastener mounting stations, means for guiding a tape into each of said stations, a fastener coupling station, means for guiding the tapes from the mounting stations into close proximity and alinement at the coupling station, means at the coupling station to unite the fasteners to join said tapes, a feed station spaced with respect to said coupling station, means at the feed station engaging the united tapes in intermittent feed of the tapes to bring longitudinally spaced sections of each tape in registering position with said spaced mounting stations, and means between the first and second stations maintaining the tapes against reverse feed movement.

11. In machines of the class described, spaced fastener mounting stations, means for guiding a tape into each of said stations, a fastener coupling station, means for guiding the tapes from the mounting stations into close proximity and alinement at the coupling station, means at the coupling station to unite the fasteners to join said tapes, a feed station spaced with respect to said coupling station, means at the feed station engaging the united tapes in intermittent feed of the tapes to bring longitudinally spaced sections of each tape in registering position with said spaced mounting stations, means between the first and second stations maintaining the tapes against reverse feed movement, and other means between the second and third station for supporting the coupled tapes against reverse feed movement.

12. In machines of the class described, spaced fastener mounting stations, means for guiding a tape into each of said stations, a fastener coupling station, means for guiding the tapes from the mounting stations into close proximity and alinement at the coupling station, means at the coupling station to unite the fasteners to join said tapes, a feed station spaced with respect to said coupling station, means at the feed station engaging the united tapes in intermittent feed of the tapes to bring longitudinally spaced sections of each tape in registering position with said spaced mounting stations, means between the first and second stations maintaining the tapes against reverse feed movement, other means between the second and third station for supporting the coupled tapes against reverse feed movement, and both of said tape guides comprising relatively adjustable plates to compensate for tapes of different widths.

13. In a machine of the character described, comprising a supporting base, right and left hand fastener attaching devices in spaced relation on said base, each device including a fastener element setting station, means directing tapes to said stations for attachment of fastener elements thereto, a unit attached to said base between said attaching devices, said unit including means for attaching the complementary elements of respective tapes together, and said unit having a swinging mounting on said base.

14. In a machine of the character described, comprising a supporting base, right and left hand fastener attaching devices in spaced relation on said base, each device including a fastener element setting station, means directing tapes to said stations for attachment of fastener elements thereto, a unit attached to said base between said attaching devices, said unit including means for attaching the complementary elements of respective tapes together, said unit having a swinging mounting on said base, and means mounting the unit on the base for quick attachment and detachment of said unit.

15. A machine for producing coupled snap fastener tapes, means for guiding tapes through fastener attaching stations, an assembly station and a feed station, the fastener attaching stations comprising spaced fastener attaching devices each comprising an anvil and a plunger movable toward and from the anvil, said first named means including tension devices for guiding the tapes between said anvils and plungers, said first named means arranging surfaces of the tapes face to face and in close proximity at the assembly station and feed station, a pair of gripper jaws at the feed station for intermittently and collectively feeding the tapes to bring predetermined widely spaced sections of the tapes in alignment with said plungers for attachment of fasteners to said widely spaced sections of the tapes at the attaching stations, means for supporting the gripper jaws in firm engagement with the tapes in feeding movement of said tapes, means separating the gripper jaws at the end of said feeding movement, and means at the assembly station for coupling the fasteners of said tapes to unite the tapes.

16. A machine for producing coupled snap fastener tapes, means for guiding tapes through fastener attaching stations, an assembly station and a feed station, the fastener attaching stations comprising spaced fastener attaching devices each comprising an anvil and a plunger movable toward and from the anvil, said first named means including tension devices for guiding the tapes between said anvils and plungers, said first named means arranging surfaces of the tapes face to face and in close proximity at the assembly station and feed station, a pair of gripper jaws at the feed station for intermittently and collectively feeding the tapes to bring predetermined widely spaced sections of the tapes in alinement with said plungers for attachment of fasteners to said widely spaced sections of the tapes at the attaching stations, means for supporting the gripper jaws in firm engagement with the tapes in feeding movement of said tapes, means separating the gripper jaws at the end of said feeding movement, means at the assembly station for coupling the fasteners of said tapes to unite the tapes, and a pair of stop fingers engaging fasteners on the coupled tapes in controlling feed stations of the tapes.

17. A machine for producing coupled snap fastener tapes, means for guiding tapes through fastener attaching stations, an assembly station and a feed station, the fastener attaching stations comprising spaced fastener attaching devices each comprising an anvil and a plunger movable toward and from the anvil, said first named means including tension devices for guiding the tapes between said anvils and plungers, said first named means arranging surfaces of the tapes face to face and in close proximity at the assembly station and feed station, a pair of gripper jaws at the feed station for intermittently and collectively feeding the tapes to bring predetermined widely spaced sections of the tapes in alinement with said plungers for attachment of fasteners to said widely spaced sections of the tapes at the attaching stations, means for supporting the gripper jaws in firm engagement with the tapes in feeding movement of said tapes, means separating the gripper jaws at the end of said feeding movement, means at the assembly station for coupling the fasteners of said tapes to unite the tapes, and adjustable means checking movement of the gripper jaws in control of spacing of the fasteners on said tapes.

18. In a machine for applying male and female fasteners to surfaces of independent mountings and to then couple the mountings in uniting said mountings with surfaces thereof adjacent each other, means for intermittently feeding a pair of mountings simultaneously to bring widely spaced sections of the mountings in position for attachment of male and female fastener devices to surfaces thereof, means for attaching the fastener devices to said sections of the mounting, a coupling station, means for guiding the mountings with the devices attached thereto into face to face close proximity to each other at said coupling station, and means at said station to couple the male and female fasteners in joining said mountings in face to face relationship.

19. In a machine for applying male and female fasteners to surfaces of independent mountings and to then couple the mountings in uniting said mountings with surfaces thereof adjacent each other, means for intermittently feeding a pair of mountings simultaneously to bring widely spaced sections of the mountings in position for attachment of male and female fastener devices to surfaces thereof, means for attaching the fastener devices to said sections of the mounting, a coupling station, means for guiding the mountings with the devices attached thereto into face to face close proximity to each other at said coupling station, means at said station to couple the male and female fasteners in joining said mountings in face to face relationship, and the means for feeding said mountings comprising a pair of gripper jaws movable toward and from the coupled mountings and longitudinally with and in respect to the mountings in the intermittent feed thereof.

20. In a machine for applying male and female fasteners to surfaces of independent mountings and to then couple the mountings in uniting said mountings with surfaces thereof adjacent each other, means for intermittently feeding a pair of mountings simultaneously to bring widely spaced sections of the mountings in position for attachment of male and female fastener devices to surfaces thereof, means for attaching the fastener devices to said sections of the mounting, a coupling station, means for guiding the mountings with the devices attached thereto into face to face close proximity to each other at said coupling station, means at said station to couple the male and female fasteners in joining said mountings in face to face relationship, the means for feeding said mountings comprising a pair of gripper jaws movable toward and from the coupled mountings and longitudinally with and in respect to the mountings in the intermittent feed thereof, and means engaging fastener devices of coupled mountings for holding the mountings against movement in a direction opposed to the feed movement thereof.

21. In a machine of the class described, means for intermittently and simultaneously feeding a pair of tape-like mountings through the machine, means for applying devices to surfaces of common widely spaced sections of each mounting in the intermittent feed of the mountings through the machine, means for guiding the mountings to bring the surfaces thereof, to which the devices are attached, into close proximity and alinement with each other at an attaching station, and means at said station to unite the devices of said mountings to form a resulting product comprising said mountings united by the spaced devices on adjacent surfaces thereof.

22. In a machine of the character described, comprising a supporting base, right and left-hand fastener attaching devices in spaced relation on said base, each device including a fastener element setting station, means directing tapes to said stations for attachment of fastener elements thereto, a unit attached to said base between said attaching devices, said unit having a fastener assemblage station and a tape feed station, means for guiding tapes through the stations of said unit in face to face relationship to each other, means at the assemblage station for assembling complementary fastener elements of the tapes together, the feed station comprising a pair of jaws movable toward and from the tapes and longitudinally with and in respect to the tapes, and means for actuating said jaws.

23. In a machine of the character described, comprising a supporting base, right and left-hand fastener attaching devices in spaced relation on said base, each device including a fastener element setting station, means directing tapes to said stations for attachment of fastener elements thereto, a unit attached to said base between said attaching devices, said unit having a fastener assemblage station and a tape feed station, means for guiding tapes through the stations of said unit in face to face relationship to each other, means at the assemblage station for assembling complementary fastener elements of the tapes together, the feed station comprising a pair of jaws movable toward and from the tapes and longitudinally with and in respect to the tapes, means for actuating said jaws, and means engaging fasteners of assembled tapes for holding the tapes against movement in one direction.

JACOB P. TRECIOKAS.

REFERENCES CITED

The following references are of record in the file of this patent:

UNITED STATES PATENTS

| Number | Name | Date |
|---|---|---|
| 149,007 | Tyson | Mar. 24, 1874 |
| 1,129,030 | Wakefield | Feb. 16, 1915 |
| 1,400,002 | Roger | Dec. 13, 1921 |
| 1,499,270 | Warner | June 24, 1924 |
| 2,168,471 | Corson | Aug. 8, 1939 |
| 2,275,769 | Kiessling | Mar. 10, 1942 |
| 2,287,263 | Nedal | June 23, 1942 |
| 2,357,889 | Gookin | Sept. 12, 1944 |

FOREIGN PATENTS

| Number | Country | Date |
|---|---|---|
| 442,358 | Great Britain | Feb. 6, 1936 |
| 550,605 | France | Dec. 19, 1922 |